United States Patent [19]

Asakura et al.

[11] 4,286,018

[45] Aug. 25, 1981

[54] BIAXIALLY ORIENTED POLY-P-PHENYLENE SULFIDE FILMS

[75] Inventors: Toshiyuki Asakura, Otsu; Yukio Noguchi, Shiga; Hiroaki Kobayashi, Otsu, all of Japan

[73] Assignee: Toray Industries, Incorporated, Tokyo, Japan

[21] Appl. No.: 32,726

[22] Filed: Apr. 23, 1979

[30] Foreign Application Priority Data

Apr. 28, 1978 [JP] Japan ................................. 53/50117
Sep. 5, 1978 [JP] Japan ................................. 53/108884
Sep. 5, 1978 [JP] Japan ................................. 53/108885
Sep. 5, 1978 [JP] Japan ................................. 53/108886
Feb. 21, 1979 [JP] Japan ................................. 54/18489

[51] Int. Cl.$^3$ .................... B32B 27/06; C08G 75/00; C08G 75/14; C08G 61/00
[52] U.S. Cl. .................... 428/332; 428/419; 428/900; 428/901; 528/373; 528/374; 528/388; 528/397
[58] Field of Search ............ 428/419, 332, 900, 901; 528/265, 373, 374, 388, 397

[56] References Cited

U.S. PATENT DOCUMENTS

| | | | |
|---|---|---|---|
| 3,354,129 | 11/1967 | Edmonds et al. | 528/265 |
| 3,919,177 | 11/1975 | Campbell | 528/373 |
| 4,024,118 | 5/1977 | Campbell et al. | 528/388 |
| 4,098,776 | 7/1978 | Tiesgen et al. | 528/373 |

OTHER PUBLICATIONS

Tabor et al., European Polymer Journal, 1971, vol. 7, pp. 1127–1133, "The Crystal Structure of Poly-p-Phenylene Sulphide", Pergamon Press.

Brady, Journal of Applied Polymer Science, 1976, vol. 20, pp. 2541–2551, "The Crystallinity of Poly(Phenylene Sulfide) and its Effect on Polymer Properties".

Hill, ACS Polymer Reprints, 20, Apr. 1979, pp. 173–176, "A New High Molecular Weight Polyphenylene Sulfide".

Primary Examiner—Thomas J. Herbert, Jr.
Attorney, Agent, or Firm—Miller & Prestia

[57] ABSTRACT

A biaxially oriented poly-p-phenylene sulfide film comprising recurring units of the formula

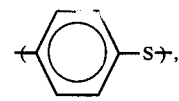

a melt viscosity of more than 100 poise and less than 600,000 poise at a shear rate of 200 sec$^{-1}$ and at 300° C., and a specific gravity of which is more than 1.330 and less than 1.400. The film has improved mechanical properties, thermal dimensional stability and high temperature durability. Typical applications of the film are as electrical insulation, capacitor, magnetic recording medium, packaging material, and so forth.

15 Claims, No Drawings

BIAXIALLY ORIENTED POLY-P-PHENYLENE SULFIDE FILMS

BACKGROUND OF THE INVENTION

Many high temperature films of aromatic polymers such as polyamide, polyimide, polyester and polysulfone are commercially produced or widely investigated to overcome the mediocre heat resistance of polyethylene terephthalate film, the most commonly used high performance industrial film. However, their poor mechanical properties as well as their economic disadvantages prohibit the wide use of these films in many applications, especially in the electrical industry.

Polyphenylene sulfide has been known as a thermoplastic polymer with a melting point of 280° to 290° C., which inherently has excellent resistance to high temperature and chemicals such as organic solvents, acids and bases. Films of polyphenylene sulfide may therefore be prepared by extruding the molten polymer through a narrow orifice and chilling the polymer in film form. Polyphenylene sulfide is now commercially produced by Phillips Petroleum Company with a trademark of "RYTON". However, "RYTON" is a resin originally for powder coating and injection molding, and from this polymer only impractical films with poor surface roughness, inferior mechanical properties and poor thermal stability can be obtained. No information of any significance is available relating to films of poly-p-phenylene sulfide, because of the difficulty in obtaining the inherent remarkable properties of poly-p-phenylene sulfide in practical films.

An object of the present invention is to provide a poly-p-phenylene sulfide film having an outstanding combination of physical, chemical and electrical properties which is industrially advantageous for various applications. Other objects will be apparent from a further description of the invention hereinafter.

SUMMARY OF THE INVENTION

This invention provides a high performance poly-p-phenylene sulfide film having a specific gravity of about 1.330 to 1.400 and a melt viscosity of about 100 to 600,000 poise at 300° C., which is produced by a biaxial orientation process preferably followed by a heat-setting process at a temperature between about 180° C. and the melting point. Such films possess many excellent mechanical properties such as tensile strength and tensile modulus, and outstanding thermal stability, which make them useful in a great variety of applications, e.g., electrical applications, protective coverings, magnetic recording medium, etc.

DETAILED DESCRIPTION OF THE INVENTION

This invention relates to a biaxially oriented poly-p-phenylene sulfide film which has many improved properties such as excellent mechanical strength, thermal dimensional stability, long term high temperature resistance and transparency. Polyester films, the most widely commercialized high performance industrial films, have been quite adequate for many applications such as insulation of motors and circuit boards, for example. However, no high temperature industrial films are quite suitable to serve this need in spite of their high heat resistance values. Polyimide films etc. face economic problems because of costly solution film manufacturing process, and polysulfone films etc. have the disadvantages of poor mechanical and chemical properties and mediocre dimensional stability at high temperature.

This invention provides an excellent film which admirably satisfies all of the foregoing requirements. In manufacturing this film according to this invention, it is essential to use a p-phenylene sulfide polymer predominantly containing recurring units of the formula

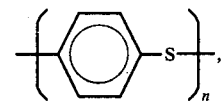

and to provide biaxial orientation to the film, preferably followed by a heat-setting process at a temperature between about 180° C. and the melting point. The film of this invention has a specific gravity greater than about 1.330 and lower than about 1.400, and its melt viscosity is about 100 to 600,000 poise, preferably 300 to 100,000 poise at 300° C. and a shear rate of 200 sec$^{-1}$.

Polyphenylene sulfide is now commercially produced by Phillips Petroleum Company under the trademark "RYTON" for the purpose of injection molding and powder coating. The injection grade "RYTON" product is a highly crosslinked polymer prepared by thermal curing, and the coating grade "RYTON" is a low molecular weight polymer. The melt flow behaviors of these polymers are not suitable for extrusion into film shapes, because melts of the injection grade "RYTON" show elastic behavior and the melt viscosity of the coating grade "RYTON" is too low. Even though they can be shaped into film by extrusion or melt-press method, the films obtained are useless for practical applications because of poor physical and thermal properties. Accordingly, no practical poly-p-phenylene sulfide film has emerged or been reported up to the present time.

It has now been found that biaxially oriented poly-p-phenylene sulfide film with certain specific characteristics shows excellent properties for many applications. The film may have, for example, a good thermal shrinkage of less than 1% after 10 minutes at 200° C. under no tension in at least one direction, which is in contrast with polyester film of more than 3% at the same condition. The film of this invention also possesses remarkable properties such as long-term high temperature endurance, mechanical strength and transparency.

The poly-p-phenylene sulfide film of this invention comprises predominantly, preferably more than 90 mol %, of recurring units of the formula

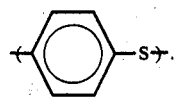

Comonomers may be used in this invention, unless a decrease in crystallinity of the polymer takes the film out of the scope of this invention. Representative non p-oriented polyphenylene sulfide units are comonomers containing entitites such as three functional units, e.g., such as:
ether unit

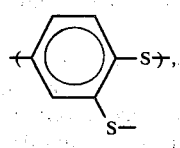

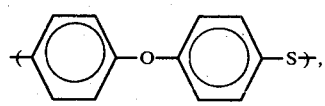

sulfone unit

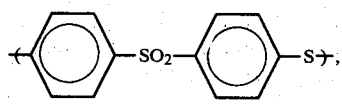

ketone unit

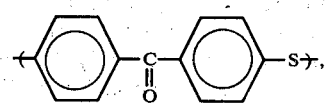

meta-oriented polyphenylene sulfide unit, and

naphthalene sulfide unit, e.g.

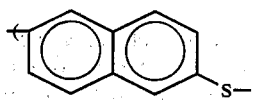

Although the poly-p-phenylene sulfide can be produced by several processes such as (1) the reaction of para-dihalobenzene with sulfur and sodium carbonate in a solvent, (2) the reaction of para-dihalobenzene with alkali metal sulfide in a solvent or (3) homopolycondensation of thiophenol in a medium of concentrated sulfuric acid, the second process is the most popular one and higher molecular weight polymer can be obtained thereby. In this process the poly-p-phenylene sulfide is produced by reacting at least one p-dihalobenzene such as p-dichlorobenzene with a mixture of an alkali metal sulfide such as sodium sulfide and a polar organic solvent such as N-methyl-2-pyrrolidone at a temperature of 200° to 350° C. and under specific conditions of pressure and polymerization period which are suitably determined by the nature of the mixture and the desired melt viscosity of the product.

Use of polymerization modifiers results in a poly-p-phenylene sulfide of higher molecular weight. Examples of polymerization modifiers include alkali metal carboxylates represented by the formula RCOOM, where R is a hydrocarbyl radical and M is an alkali metal, such as lithium acetate, sodium acetate, sodium propionate, sodium benzoate or lithium benzoate. These polymerization modifiers, when used in the polymerization step, are added to the reaction mixture in an amount of about 20 to 200 mole % based upon the monomer.

The melt viscosity of poly-p-phenylene sulfide in this invention is required to be in the range of about 100 to 600,000 poise, preferably 300 to 100,000 poise at 300° C. and a shear rate of 200 sec$^{-1}$. The melt viscosity may be measured by a conventional rotational viscometer or extrusion plastometer. Use of a polymer having a higher melt viscosity than specified above encounters the problem of poor extrudability. On the other hand, practicable film shaped substances with uniform thickness cannot be obtained from a polymer of lower melt viscosity.

Poly-p-phenylene sulfide has the unique characteristic that when it is exposed to air at a higher temperature than about 200° C., crosslinking and branching takes place, probably by the incorporation of oxygen, resulting in a non-linear polymer chain. Highly crosslinked or branched poly-p-phenylene sulfide is not desirable in the film of this invention because of its poor melt flow behavior and poor stretchability of the extruded film as well as poor surface smoothness. Therefore, for the sake of this invention, the addition of the polymerization modifier in the polymerization mixture is most preferable in order to obtain linear high molecular weight poly-p-phenylene sulfide, because the polymer to be formed into film is preferable to have the specified melt viscosity without any thermal curing. A polymer having a melt viscosity of more than 20 times its initial value after thermal curing is especially unsuitable for films of this invention.

Another criterion relevant to the extent of crosslinking or branching is the non-Newtonian coefficient n, which is defined as follows:

$$\dot{\gamma} = 1/\mu Y^n$$

where $\dot{\gamma}$ is the shear rate, $\gamma$ is the shear stress and $\mu$ is the apparent melt viscosity. n is obtained approximately by plotting $\dot{\gamma}$ in correlation with $\gamma$. Poly-p-phenylene sulfide with a higher content of crosslinking and branching tends to have a higher value of n. Accordingly, poly-p-phenylene sulfide with an n value of larger than about 0.9 and less than about 2.0 is suitable for the film of this invention. The melt viscosity and other data are measured at 300° C. However, a small amount of crosslinking or branching, i.e., less than 10 mole %, preferably 1 mole %, may produce good results in respect of melt viscosity control.

The polymer may be blended with fillers, pigments, anti-oxidants, UV absorbers, other additives, other polymers, plasticizers and the like as long as the scope of this invention is substantially observed.

The biaxially oriented poly-p-phenylene sulfide film of this invention has a specific gravity of 1.330 to 1.400 at 25° C. Film having a specific gravity lower than 1.330 has inferior mechanical properties and the crucial defect that it turns opaque and brittle at higher temperatures, such as above 120° C. Film having a specific gravity above 1.400 is not flexible and has little tear resistance. The melt viscosity of the film of this invention, which does not make a substantial change through the film manufacturing process, is in the range of about 100 to 600,000 poise, preferably 300 to 100,000 poise, at 300° C. and at a shear rate of 200 sec$^{-1}$.

The film of this invention is substantially transparent, and the haze of the film is less than 20%, preferably less than 10% for a film basis 25 microns thick. The transparency of the film does not change up to a temperature of 150° C. Although the incorporation of fillers, additives and other polymers into the film as well as an intentionally roughened surface may decrease the transparency of the film, such modifications are considered to be within the scope of this invention.

The manufacturing process of the film in this invention is exemplified as follows.

Molten poly-p-phenylene sulfide is extruded or melt pressed at a temperature in the range between the melting point and 350° C., and is thereafter quenched to form an amorphous film. A quench rate faster than 5° C./sec is necessary to create an amorphous transparent film having a degree of crystallinity of less than 15%. A slower quench rate leads to growth of spherulites, resulting in opaque and brittle film. The crystallization rate of poly-p-phenylene sulfide is considerably faster than that of polyethylene terephthalate film.

This amorphous film is biaxially oriented by two-dimensional stretching at an area ratio of larger than 3, preferably larger than 4. A lower area ratio than the above specified results in a brittle and cloudy film during a following heat treatment process. Generally the upper limit of the area ratio, which is determined by film breakage, is about 25. This orientation may be accomplished, for example, by simultaneous stretching, blowing or rolling at a temperature of 80° to 120° C. The successive stretching process is often more suitable industrially. In this case the amorphous film is first stretched in one direction, usually longitudinally or in the machine direction in a continuous process, at a ratio of 2 to 5, preferably 2.5 to 5 at a temperature between 80° to 120° C., preferably 80° to 110° C., so that the film birefringence in the stretching direction is between 0.05 to 0.30. A higher birefringence than the above specified range results in a fibrillating and cloudy film having micropores, which film is practically useless. A lower birefringence results in a brittle film and causes serious problems during the heat treatment process, such as a formation of opaque spots and wrinkles, for example.

After longitudinal stretching the film is stretched in a transverse direction at a ratio of 1.5 to 5 at a temperature between 80° to 150° C., preferably 90° to 140° C. to form a biaxially oriented film. Stretching at a temperature lower than 80° C. causes many problems such as frequent film breakage, and stretching at a temperature higher than 150° C. causes partial crystallization resulting in a brittle film as well as frequent film breakage and a decrease in orientation efficiency.

Though some crystallization may take place as a result of these orientation processes, the density of the film is usually lower than 1.330 at this stage, unless specific stretching conditions are applied or intentional thermal crystallizations are carried out during the orientation process. Films having a density lower than 1.330 before heat setting are unstable to high temperature. For example when they are exposed to a temperature exceeding the drawing (stretching) temperature, they shrink to a large extent and furthermore, above 150° C., they turn opaque and brittle.

The biaxially oriented film is then subjected to an elevated temperature within the range of about 180° C. to the melting point (that of homopolymerized p-phenylene sulfide is around 280° C.) while the film is maintained under tension. This heat treatment process is conveniently carried out by use of a conventional film tenter. The density of the film increases to the range of about 1.330 to 1.400. The heat treatment time depends on the desired film density, ranging from 1 sec to several minutes.

The film thus prepared in accordance with this invention shows superior high temperature stability, that is, it does not turn cloudy or brittle up to a temperature almost as high as the melting point. The degree of planar orientation of the film measured by the X-ray pole figure method is more than about 0.50, preferably more than 0.75.

The film of this invention has a variety of important applications because of its excellent mechanical properties, thermal and hygroscopic dimensional stability, clarity and high temperature resistance. Representative applications are electric insulation, capacitors, flexible circuit boards, packaging, wall covers for rooms and equipment, magnetic recording tape base, acoustic membranes, photographic films and so on.

Typical significant properties of the film may include a tensile strength of larger than about 5 kg/mm$^2$, an ultimate elongation of larger than about 10% and a tensile modulus of larger than about 250 kg/mm$^2$, at least in one direction. They are preferably larger than about 10 kg/mm$^2$, 15% and 300 kg/mm$^2$, respectively. Generally, they cannot be higher than 100 kg/mm$^2$, 200%, 1,000 kg/mm$^2$ by the present invention. The ultimate elongation of poly-p-phenylene sulfide film increases characteristically as a planar orientation of the film increases by a stretching process. These well balanced mechanical properties are required in many applications.

The dielectric strength of the film is larger than 100 kV/mm. Generally its value is limited lower than about 500 kV/mm. The biaxially oriented poly-p-phenylene sulfide film having a dielectric strength and a tensile strength above specified is very suitable to the application of electric insulation. Its electrical dissipation factor is less than about 1.0% for 1,000 Hz from room temperature up to 150° C. The film having this property is quite suitable for the capacitor, especially for that exposed at a higher temperature.

The heat shrinkage (thermal dimensional shrinkage), which is strongly dependent on the heat treatment temperature and relaxation condition, can be less than about 10% preferably 5%, at 250° C. after 30 seconds exposure under no tension, which is useful for soldering operations on flexible circuit boards. For this application the folding endurance of the film under a weight of 2.5 kg/mm$^2$, which is in excess of about 500 times in this invention, is also essential.

The thermal linear expansion coefficient of the film is about $-2.0 \times 10^{-4}$ mm/mm/°C., preferably 0 to $1.0 \times 10^{-4}$ mm/mm/°C., within a temperature range between 20° to 150° C. This low value of thermal linear expansion coefficient, as well as the tensile modulus above specified, are useful for the application of the base film of magnetic recording medium.

Since films with smooth surfaces in accordance with this invention can be substantially clear, the total haze value of a 25 micron thick film can be less than about 20% in the absence of additives, fillers or blend polymers. Generally the haze value is larger than about 0.2%. The haze value is substantially unchanged up to 150° C., a higher temperature than a crystallization threshold temperature of poly-p-phenylene sulfide.

The transparency of the film depends primarily on the refractive index difference of crystalline and amorphous part, and on the sizes and shapes of the crystalline components, which means that the crystal size in the film of this invention is small enough to provide excellent transparency. The growth of large sperulite cyrstals leads to the formation of opaque film.

Long-term high temperature resistance is also one of the important properties of the film of this invention. Standard thermal aging tests in an air circulating oven may be carried out to check its excellence. The tensile strength and elongation of the film, for example, can retain more than 20% of its original value after 10 days exposure in a 220° C. oven. These films justify classification above F-class film in conventional criteria for electrical insulation materials.

Reference is now made briefly to certain preferred methods by which the physical and other properties of the film may be measured and obtained.

Various methods are employed for density determination, but one method involves the use of a density gradient tube which an aqueous solution of lithium bromide at 25° C. Small samples are stored in a desiccator with $P_2O_5$ for 72 hours before the measurement is made.

Melt viscosity and melt behavior of the polymers at 300° C. are measured by extrusion plastometer type viscometers, and in this case the Koka-shiki flow tester (Shimazu Seisakusho) has been used with a hole dimension of 1 mm in diameter and 10 mm in length.

Haze is conveniently measured by use of an integrated sphere type hazemeter (Nippon Seimitsu Kogaku) and is calulcated from the following equation:

$$\text{Haze} (\%) = \left( \frac{T_d}{T_t} - \frac{T_f}{100} \right) \times 100$$

where $T_t$=intensity of total light transmitted, $T_d$=intensity of light scattered, $T_f$=instrument constant.

The degree of planar orientation is readily obtained by the X-ray pole figure method. Films of known thickness are stuck to a sample about 400 thick by means of an amorphous adhesive such as Collodion. The sample is mounted on the pole figure goniometer stage, B-4, of a Riguku Denki type D-8C X-ray diffractometer and scanned by the reflection method (Schultz method) or transmission method (Deckar method). The sample is rotated stepwise in increments of 2° from 90° to 10° around the Z-axis (machine direction, α-rotation) and at each α-position the sample is rotated within the film plane by 360° (β-rotation). Recording of diffraction intensity, calibration by absorption factor and orientation distribution, and drawing of the pole figure are aided by a computer. A strong diffraction peak is observed between 19° and 21° for the poly-p-phenylene sulfide film, so this diffraction intensity is measured for the pole figure. From the pole figure the planar orientation coefficient is calculated as the ratio of in-plane intensity for this diffraction peak.

Tensile strength, ultimate elongation and tensile moludus are measured on an "Instron" tensile tester at 20° C. and 75% RH, based on JIS L-1073. The tensile modulus is obtained from the initial linear portion of the S-S curve.

Birefringence can be measured by a polarized microscope using the relationship that phase retardation of polarized light is the product of film thickness and birefringence, where the phase retardation of light is caused by the phenomenon that the film transmits light faster along one direction than along a perpendicular direction. Retardation is measured by means of a compensator such as a calibrated quartz wedge.

EXAMPLE 1

To a stirred 1 liter autoclave were charged 1 mole sodium sulfide ($Na_2S.9H_2O$), 0.14 mole sodium hydroxide, 0.90 mole lithium acetate ($CH_3COOLi.2H_2O$) and 400 ml N-methyl-2 pyrrolidone. The mixture was heated under a slow $N_2$ flush to 200° C. in 2 hours to distill the water. Then the reactor was cooled to 170° C. and 1.02 mole 1,4-dichlorobenzene and 0.006 mole 1,2,4-trichlorobenzene were added. The resulting system was closed off under 4 kg/cm² nitrogen pressure and heated to 270° C. and maintained for three hours. The resulting powdery polymer was washed with hot water five times and with acetone twice and then dried at 70° C. in a vacuum oven.

The yield of poly-p-phenylene sulfide was 85%. It had a melt viscosity of 2,800 poise at 300° C., 200 sec$^{-1}$.

This polymer was melt pressed at 300° C. and quenched into a transparent amorphous film with a density of 1.320 by submerging it in liquid nitrogen within 5 seconds after it was taken out of the heat press.

This film was simultaneously biaxially stretched at 90° C. to 3 times its original length, using a film stretcher (T.M. Long). The film density was 1.320 the same as before stretching. The film was then fixed on a square metal frame and heat treated at 270° C. for 20 seconds, resulting in a 10-micron thick film having a density of 1.357 and a haze value of 3%.

The planar orientation of this film was 0.800 and its heat shrinkage was 0.50% at 200° C. after 10 minutes. The mechanical properties of the film included a tensile strength of 13 kg/mm², an elongation of 60% and a tensile modulus of 390 kg/mm².

The film retained more than 50% of both its initial tensile strength and elongation after 240 hours exposure in an air oven at 220° C.

EXAMPLE 2

The reaction of this Example was carried out the same as in Example 1, except that lithium bromide was used instead of lithium acetate, and no 1,2,4-trichlorobenzene was added. Although the polymerized product had a relatively lower melt viscosity of 160 poise at 300° C., 200 sec$^{-1}$, a transparent amorphous film having a density of 1.318 was obtained by melt-pressing at 290° C. and quenching in 10° C. cold water in 10 seconds. The non-Newtonian coefficient n of this polymer was measured and found to be 1.05. Simultaneous biaxial orientation was carried out on this film, 2.5 times by 2.5 times at 95° C., followed by heat treatment at 250° C. for 30 seconds under tension, resulting in a transparent 25 micron thick film with a density of 1.365, a haze of 4.0% and a planar orientation of 0.790. The resulting film was a well balanced high temperature film with a heat shrinkage of 0.45% at 200° C. after 10 minutes, a tensile modulus of 405 kg/mm², a tensile strength of 11 kg/mm² and an ultimate elongation of 39%.

EXAMPLE 3

This is a reference run. Ryton "V-1" (Phillips Petroleum Company) was melt-pressed as in Example 2. The resulting film was transparent, but was too brittle for practical use as a film.

EXAMPLE 4

This is also a reference run. In Example 1, the melt-pressed amorphous film was heated in an oven. The film turned opaque and brittle at a temperature exceeding 120° C.

The stretched film before heat treatment was heated in an oven without tension. The film showed a heat shrinkage of more than 100% at a temperature of 100° C., and up to 150° C. the film turned opaque and brittle.

EXAMPLE 5

This is also a reference run. Ryton "R-6" (Phillips Petroleum Company) was melt-pressed as in Example 2. The resulting film was tough and transparent, but could not be simultaneously biaxially stretched by a film stretcher to more than 1.5 by 1.5 times. Heat treatment at a temperature exceeding 150° C. could not be applied to this stretched film because of turning opaque and/or film breakage. The non-Newtonian coefficient n of the Ryton "R-6" was 2.14.

EXAMPLE 6

This is also a reference run. Polymerization was carried out as in Example 1 except that lithium acetate was not added to the mixture. The melt viscosity of the polymer obtained was 70 poise at 300° C., 200 sec$^{-1}$. This polymer was melt-pressed and quenched in ice water to form a transparent amorphous film. This film could be simultaneously stretched biaxially to no more than 1.7 times by 1.7 times by a film stretcher. The film could not maintain its transparency at a higher heat treatment temperature than 180° C. The film heat treated at a lower temperature showed poor mechanical properties and thermal stability.

EXAMPLE 7

The polymerization mixture contained 1 mole Na$_2$S.9H$_2$O, 0.10 mole sodium hydroxide, 0.90 mole lithium acetate, 400 ml N-methyl-2 pyrrolidone in a stirred 1 liter autoclave as in Example 1. After distillation of water 1 mole 1,4-dichlorobenzene was added, and then the initial pressure was set at 4 kg/cm$^2$ with nitrogen at 180° C. Thereafter the system was heated at 270° to 280° C. for 3 hours with a maximum pressure of 12 kg/cm$^2$. The polymer particles was washed with water and acetone and then dried (80% yield).

The melt viscosity of the polymer was 560 poise at 300° C., 200 sec$^{-1}$. This polymer was melt-pressed at 300° C. and quenched into a colorless transparent amorphous film with a density of 1.318. This film was biaxially stretched successively to 3.5 times by 2.5 times on a film stretcher, and a 12μ thick film was obtained by heat treatment at 270° C. for 30 sec under tension. The resulting film had a haze value of 2.2%, a density of 1.360, a heat shrinkage at 200° C. and 10 minutes of 0.60% and 0.40% for the respective directions and a planar orientation of 0.820. The mechanical properties of the film in a longitudinal direction included a tensile strength of 13.5 kg/mm$^2$, an ultimate elongation of 60%, a tensile modulus of 380 kg/mm$^2$ and a folding endurance (MIT) of 4,000 times.

EXAMPLES 8–13

Various runs were conducted. Their polymerization conditions and the selected properties of the resulting films are listed in the following Table "A".

In the Table, the following designations apply:

| *1 | : | Film was stretched at 95° C. by a film stretcher. |
|---|---|---|
| *2 | : | Film was heat treated at 260° C. for 30 seconds under tension. |
| *3 | : | Haze value is calculated on a 25 micron thick film basis, by the following simple correlation. |

$$\text{Haze (25 basis)} = \text{Haze (observed)} \times \frac{25}{\text{thickness of the film in microns}}$$

TABLE "A"

| No. | Polymerization mixture | | Polymerization conditions | Melt viscosity | Stretching condition and stretchability*1 | Film*2 density | Haze*3 | Film properties | |
|---|---|---|---|---|---|---|---|---|---|
| EXAMPLE 8 | 1,4-dichlorobenzene<br>Na$_2$S . 9H$_2$O<br>LiCl<br>NaOH<br>1,2,5 trichlorobenzene | 1.01mole<br>1.00<br>0.90<br>0.15<br>0.006 | 275° C. -<br>3 hrs<br>in NMP<br>400 ml | 3,000 poise | Simultaneous biaxially 3.0 × 3.0 uniformly stretched | 1.357 | 3.0% | heat shrinkage at 200° C.<br>planar orientation<br>tensile strength | 0.4%<br><br>0.880<br>13.0 kg/mm$^2$ |
| EXAMPLE 9 | 1,4-dichlorobenzene<br>Na$_2$S . 9H$_2$O<br>Li(OAC) . 2H$_2$O<br>NaOH<br>4,4-dichlorodiphenyl sulfone | 1.02mole<br>1.00<br>0.90<br>0.14<br>0.05 | 280° C. -<br>3 hrs<br>in NMP<br>400 ml | 220 poise | Simultaneous biaxially 2.7 × 2.7 uniformly stretched | 1.350 | 2.8% | heat shrinkage at 200° C.<br>tensile strength<br><br>ultimate elongation | 0.65%<br><br>12.2 kg/mm$^2$<br>65% |
| EXAMPLE 10 | 1,4-dichlorobenzene<br>Na$_2$S . 9H$_2$O<br>Li(OAC) . 2H$_2$O<br>NaOH<br>1,3,5-tri(4-chlorophenyl) benzene | 1.02mole<br>1.00<br>0.90<br>0.14<br>0.005 | 270° C. -<br>6 hrs<br>in NMP<br>400 ml | 4,500 poise | Simultaneous biaxially 3.1 × 3.1 uniformly stretched | 1.362 | 2.0% | heat shrinkage at 200° C.<br>planar orientation<br>tensile strength | 0.5%<br><br>0.895<br>14.5 kg/mm$^2$ |
| EXAMPLE 11 (reference run) | same as Example 1 | | curing in air at 270° C. for 240 hrs | more than 650,000 poise | Uniform film shaped object cannot be cast. Poor stretchability | — | — | No practical film was obtained. | |
| EXAMPLE 12 (reference | 1,4-dichlorobenzene<br>Na$_2$S . 9H$_2$O<br>Li(OAC) . 2H$_2$O | 0.82mole<br>1.00<br>0.90 | 280° C. -<br>3 hrs<br>in NMP | 110 poise | Simultaneous biaxially stretching | — | — | Very brittle | |

TABLE "A"-continued

| No. | Polymerization mixture | | Polymerization conditions | Melt viscosity | Stretching condition and stretchability*1 | Film*2 density | Haze*3 | Film properties |
|---|---|---|---|---|---|---|---|---|
| run) | NaOH | 0.14 | 400 ml | | impossible | | | |
| | 4,4'-dichlorodiphenyl sulfone | 0.20 | | | | | | |
| EXAMPLE 13 (reference run) | 1,4-dichlorobenzene | 0.70mole | 270° C. - 10 hrs | more than 650,000 poise | Simultaneous biaxial 1.2 × 1.2 Poor stretchability | 1.337 | 5.6% | Brittle film and thermally unstable. |
| | Na2S . 9H2O | 1.00 | | | | | | |
| | Li(OAC) . 2H2O | 0.90 | | | | | | |
| | NaOH | 0.14 | | | | | | |
| | 1,2,5-trichlorobenzene | 0.31 | | | | | | |

EXAMPLE 14

10 moles sodium sulfide ($Na_2S.9H_2O$), 1.4 mole sodium hydroxide, 9.9 mole lithium acetate ($CH_3COOLi.2H_2O$), 40 moles N-methyl 2 pyrrolidone were charged into a stirred autoclave, and then water was removed at 200° C. 10.2 moles 1,4-dichlorobenzene were added to the mixture and the initial pressure was kept at 3 kg/mm$^2$ with nitrogen, then heated and maintained at 275° C. for 3 hours. Poly-p-phenylene sulfide particles were obtained with a yield of 75% by washing the polymerization mixture with water and acetone and then drying.

The polymer viscosity was 650 poise at 300° C., 200 sec$^{-1}$. Molten polymer was extruded at a temperature of 305° C. through a die onto a cooled casting drum. 15μ thick and 270μ thick unoriented transparent films were obtained. The 270μ thick film was continuously stretched longitudinally 3.5 times at 90° C. with a set of rolls, and then transversely 3.5 times at 95° C. in a tenter. The film was then subjected to an elevated temperature of 270° C. for 30 sec, while the film was maintained under transverse tension. A transparent 12μ thick film was obtained.

The magnetic dispersion listed below was coated on both 12μ thick biaxially oriented film and 15μ thick unoriented film, so that a 5μ thick magnetic layer was formed after drying.

| | Parts by weight |
|---|---|
| γ-$Fe_2O_3$ | 32 |
| carbon black | 2.7 |
| Vinylite (U.C.C.) VAGH | 4.5 |
| Esline (Goodrich) 5701 | 5.0 |
| methyl ethyl ketone | 22 |
| methyl isobutyl ketone | 12.7 |
| toluene | 21 |
| Soya lecithin dispersant | 1 |

The resulting magnetic video tapes were tested on a helical-scan video recorder (Panasonic NV 3020, Matsushita Electric Industrial Co., Ltd.) and produced the performance data illustrated in the following Table "B".

TABLE "B"

| | Base film tensile modulus (kg/mm$^2$) | Thermal expansion coefficient (mm/mm/°C.) | Tape Runnability | Skew a (μ sec) | Skew b (μ sec) |
|---|---|---|---|---|---|
| 12 Biaxially oriented film | 420 | 0.3 × 10$^{-4}$ | Excellent | 8 | 2 |
| (in this invention) 15 Unoriented film (out of this invention) | 180 | above 2.5 × 10$^{-4}$ | Poor (edge damage) | above 25 | 2 |

Skew a is the skew caused by the temperature gap between the recording time and the reproduction time. This is represented by the distance between the vertical line and the skewed line at the bottom of the VTR picture, which skewed line was obtained by reproduction after 24 hours of aging at 80° C. of the original tape, where the vertical line was recorded at room temperature (20° C., 60% relative humidity). Skew b is the skew caused by the relative humidity gap between recording time and reproduction time. This is similarly represented in the manner of skew a, after 24 hours of aging at 40° C., and at 80% relative humidity. The vertical line was recorded at 20° C., 20% relative humidity.

The thermal expansion coefficient was determined by measuring the distance between two marks on the film heated from 20° C. to 150° C. at a rate of 2° C./min under a tension of 1 gr/5 mm.

EXAMPLE 15

Poly-p-phenylene sulfide was obtained as in Example 14 except the polymerization period was 8 hours at 280° C. The film was simultaneously biaxially stretched 3.5 times by 3.5 times at 90° C. by a film stretcher, followed by heat treatment at 270° C. for 30 seconds.

The properties of the resulting film are listed in the following Table "C". Films made from "RYTON" R-6 (Phillips Petroleum Company) as described in Example 5 are also listed in the Table. Dielectric strength was measured using a dielectric strength tester (Toyo Denki Kosakusho) in accordance with ASTM D-149-64.

TABLE "C"

| | EXAMPLE 15 | EXAMPLE 5 |
|---|---|---|
| Tensile strength (kg/mm$^2$) | 18 | 3.2 |
| Ultimate elongation (%) | 58 | 8 |
| Dielectric strength (kV/mm) | 250 | 160 |
| Folding endurance (MIT) | more than 100,000 | 500 |
| Appearance in 250° C. solder bath | no change | opaque and cloudy |
| Aging time to reduce the ultimate elongation to 50% | more than 100 hours | less than 1 minute |

TABLE "C"-continued

| | EXAMPLE 15 | EXAMPLE 5 |
|---|---|---|
| of its initial value in 250° C. air | | |

The film of this invention proved to be very suitable for use as electrical insulation material.

EXAMPLES 16–23

4.9 moles sodium sulfide ($Na_2S.9H_2O$), 0.75 mole sodium hydroxide, 4 moles lithium acetate ($CH_3COOLi.2H_2O$ and 5 moles 1,4-dichlorobenzene were added to a 5 l autoclave with N-methyl 2 pyrrolidone and a polymer was obtained by a similar procedure as in Example 1. The polymer had a melt viscosity of 2,500 poise and a non-Newtonian coefficient n of 1.15. This polymer was extruded using a 30 mm diameter extruder with a semi-rapid type screw at 300° C. and cast on the surface of a drum maintained at 20° C., resulting in a 250μ thick amorphous film having a density of 1.327.

This film was stretched in various ways as listed in the Table "D" by a film stretcher. All films were heat treated at 250° C. for 60 sec under tension. The properties of the final films are also listed in the following Table "D".

C., and then continuously stretched longitudinally with a set of three rolls maintained at 95° C. at a rate of 10,000%/minute to 3.5 times, followed by a contact with a cooling roll maintained at 25° C. The film at this point had a density of 1.325 and a birefringence of 0.13.

In Example 24, the film was transversely stretched in a tenter 3.5 times at 97° C. at a rate of 250%/minute, and then the oriented film was heat set at a film temperature of 260° C. for 30 seconds in a tenter provided with electrical radiation heaters. The properties of the transparent film of 22μ thickness are listed in Table "E".

In Example 25, the film monoaxially oriented was heated up to 110° C. for 2 minutes in a tenter so that the film density rose to 1.339. This film was transversely stretched and heat set under the same conditions as in Example 24. The properties of the resulting film are also listed in Table "E".

TABLE "E"

| | EXAMPLE 24 1.358 | | EXAMPLE 25 1.360 | |
|---|---|---|---|---|
| Density (g/cm$^3$) | | | | |
| Mechanical Properties | longitudinal | transverse | longitudinal | transverse |
| Tensile strength (kg/mm$^2$) | 15 | 12 | 19 | 18 |
| Tensile modulus (kg/mm$^2$) | 360 | 340 | 395 | 380 |
| Ultimate elongation | 35 | 45 | 35 | 50 |
| Tear strength (Elmendorf, g/mm) | 180 | 220 | 200 | 200 |

TABLE "D"

| | EXAMPLE 16 | EXAMPLE 17 | EXAMPLE 18 | EXAMPLE 19 | EXAMPLE 20 | EXAMPLE 21 | EXAMPLE 22 (reference run) | EXAMPLE 23 (reference run) |
|---|---|---|---|---|---|---|---|---|
| longitudinal stretching | | | | | | | | |
| preheating temperature (°C.) | 87 | 87 | 87 | — | — | 87 | — | 80 |
| preheating period (sec) | 60 | 60 | 60 | — | — | 60 | — | 60 |
| stretching temperature (°C.) | 90 | 95 | 95 | 100 | 100 | 90 | 75 | 90 |
| stretching rate (%/min) | 10,000 | 1,000 | 1,000 | 500 | 500 | 20,000 | 1,000 | 1,000 |
| stretch ratio | 3.5 | 3.5 | 3.5 | 3.0 | 3.0 | 3.7 | break at 1.2 times | 1.8 |
| cooling after stretcher | taken out to room temperature air in 5 sec | ibid | ibid | no cooling | taken out to room temperature air in 5 sec | ibid | — | taken out to room temperature air in 5 sec |
| film density | 1.337 | 1.328 | 1.340*[1] | 1.322 | 1.326 | 1.339 | — | 1.325 |
| birefringence | 0.17 | 0.11 | 0.11 | 0.07 | 0.08 | 0.20 | — | 0.03 |
| transverse stretching | | | | | | | | |
| stretching temperature (°C.) | 97 | 97 | 97 | 100 | 100 | 97 | — | 97 |
| stretching rate (%/min) | 500 | 500 | 500 | 500 | 500 | 700 | — | 500 |
| stretch ratio | 3.5 | 3.5 | 3.5 | 3.0 | 3.0 | 3.7 | — | 1.4 |
| film properties | | | | | | | | |
| tensile modulus (kg/mm$^2$) (longitudinal/transverse) | 480/410 | 400/390 | 430/400 | 320/310 | 360/330 | 510/420 | — | 260/200*[2] |
| tensile strength (kg/mm$^2$) (longitudinal/transverse) | 21/18 | 19/17 | 20/17 | 14/14 | 16/14 | 23/21 | — | 10/8 |
| density (g/cm$^3$) | 1.360 | 1.360 | 1.365 | 1.358 | 1.358 | 1.368 | — | 1.327 |

*[1]Density was intentionally increased by heating the film at 110° C. for 5 min. under tension.
*[2]This film was not heat treated because the film turned cloudy at a higher heat treatment temperature.

EXAMPLES 24–25

The same polymerization procedure as in Example 16 was carried out except that 0.01 mole 1,2,4-trichlorobenzene was added to the mixture. The resulting polymer had a melt viscosity of 3,500 poise, and a non-Newtonian coefficient of 1.40.

The 250μ thick amorphous film made from this polymer was contacted with a preheat roll maintained at 75°

We claim:
1. A heat set biaxially oriented poly-p-phenylene sulfide film comprising predominantly a plurality of recurring units of the formula

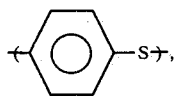

said film having a specific gravity of about 1.330 to 1.400 and a melt viscosity of about 100 to 600,000 poise at 300° C. and at a shear rate of 200 sec$^{-1}$.

2. The film of claim 1, wherein the haze value for a 25 micron thick film is less than 20% in the absence of any additives, and wherein said haze is substantially unchanged up to about 150° C.

3. The film of claim 1, produced by biaxially stretching to an extent of at least an area ratio of about 3 followed by heat-setting at a temperature between about 180° C. and the melting point.

4. A heat set biaxially oriented poly-p-phenylene sulfide film comprising predominantly a plurality of recurring units of the formula

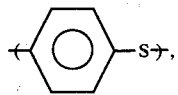

said film having a melt viscosity of about 100 to 600,000 poise at 300° C. and at a shear rate of 200 sec$^{-1}$, produced by biaxially stretching to an extent of an area ratio of about 3 to 25, followed by heat-setting at a temperature between about 180° C. and the melting point.

5. A heat set biaxially oriented poly-p-phenylene sulfide film comprising predominantly a plurality of recurring units of the formula

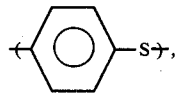

produced by a process which comprises (a) casting amorphous poly-p-phenylene sulfide film, (b) stretching said amorphous film within the range of about 2.0 to 5.0 times at a temperature between about 80°–120° C., so that the film birefringence in the stretching direction is between 0.05 to 0.30, thereafter (c) stretching said film in a direction transverse to that of step (b) within a range of about 1.5 to 5.0 times at a temperature between about 80°–150° C., thereby producing a biaxially stretched film, and (d) heat-setting said biaxially oriented film at a temperature between about 180° C. and the melting point.

6. The film of claim 1 or 4 or 5, wherein the non-Newtonian coefficient of said poly-p-phenylene sulfide at 300° C. is larger than about 0.9 and smaller than about 2.0.

7. The film of claim 1 or 4 or 5, wherein the melt viscosity of said poly-p-phenylene sulfide, at 300° C. and at a shear rate of 200 sec$^{-1}$, is greater than about 300 poise and smaller than about 100,000 poise without prior curing.

8. The film of claim 1 or 4 or 5, which is non-fibrillating and has a tensile strength of about 5 to 100 kg/mm$^2$, and a tensile modulus of about 250 to 1,000 kg/mm$^2$ at least in one direction.

9. The film of claim 1 or 4 or 5, which has an ultimate elongation of about 10 to 200%.

10. A heat set biaxially oriented poly-p-phenylene sulfide film wherein the degree of planar orientation of the film measured by the X-ray pole figure method is more than about 0.50.

11. A heat set biaxially oriented film comprising poly-p-phenylene sulfide and additive and/or filler wherein said poly-p-phenylene sulfide is composed of predominantly a plurality of recurring units of the formula

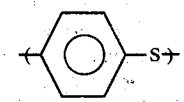

said film having a specific gravity greater than about 1.330 and lower than about 1.400, a melting viscosity of about 100 to 600,000 poise at 300° C. and at a shear rate of 200$^{-1}$.

12. Electric insulation material comprising a heat set biaxially oriented film consisting essentially of a high molecular weight poly-p-phenylene sulfide comprising predominantly a plurality of recurring units of the formula

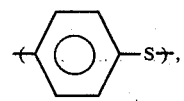

said film having a dielectric strength of greater than about 100 kV/mm and a tensile strength of greater than about 5 kg/mm$^2$ at least in one direction.

13. Magnetic recording medium comprising a heat set biaxially oriented film consisting essentially of a high molecular weight poly-p-phenylene sulfide comprising predominantly a plurality of recurring units of the formula

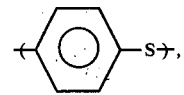

said film having a tensile modulus of greater than about 250 kg/mm$^2$ and a thermal linear expansion coefficient of about 2.0×10$^{-4}$ to 2.0×10$^{-4}$ mm/mm/°C. within a temperature range between 20°–150° C. at least in one direction.

14. A capacitor comprising a heat set biaxially oriented film consisting essentially of a high molecular weight poly-p-phenylene sulfide comprising predominatly a plurality of recurring units of the formula

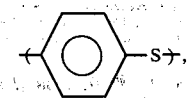

said film having an electrical dissipation factor of less than about 1.0% for 10$^3$ Hz from room temperature up to 150° C.

15. A printed circuit board comprising a heat set biaxially oriented film consisting essentially of a high molecular weight poly-p-phenylene sulfide comprising predominantly a plurality of recurring units of the formula
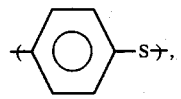
said film having a thermal dimensional shrinkage of less than about 5% at 250° C. after 30 seconds exposure, and a folding endurance under a weight of 2.5 kg/mm$^2$ in excess of about 500 times at least in one direction.
* * * * *

UNITED STATES PATENT AND TRADEMARK OFFICE
CERTIFICATE OF CORRECTION

PATENT NO. : 4,286,018
DATED : August 25, 1981
INVENTOR(S) : Toshiyuki Asakura et al It is certified that error appears in the above-identified patent and that said Letters Patent are hereby corrected as shown below:

Column 4, line 41 "rate, y is" should read --rate, T is--

Column 4, line 43 "with y" should read --with T--

Signed and Sealed this

Eleventh Day of May 1982

[SEAL]

Attest:

GERALD J. MOSSINGHOFF

Attesting Officer     Commissioner of Patents and Trademarks